United States Patent
Le et al.

(10) Patent No.: US 8,918,304 B2
(45) Date of Patent: Dec. 23, 2014

(54) SYSTEM AND METHOD FOR TUNING GEO-LOCATION IN WIDEBAND CODE DIVISION MULTIPLE ACCESS (WCDMA) NETWORKS

(75) Inventors: Le Le, Reston, VA (US); Irina Cotanis, Warrenton, VA (US)

(73) Assignee: Ascom Network Testing Inc., Reston, VA (US)

( * ) Notice: Subject to any disclaimer, the term of this patent is extended or adjusted under 35 U.S.C. 154(b) by 453 days.

(21) Appl. No.: 13/188,894

(22) Filed: Jul. 22, 2011

(65) Prior Publication Data
US 2013/0024155 A1    Jan. 24, 2013

(51) Int. Cl.
| | |
|---|---|
| G01C 9/00 | (2006.01) |
| G01S 3/02 | (2006.01) |
| H04W 24/00 | (2009.01) |
| G01S 5/02 | (2010.01) |
| G01S 5/14 | (2006.01) |

(52) U.S. Cl.
CPC .. G01S 5/021 (2013.01); G01S 5/14 (2013.01)
USPC .......................... 702/150; 342/458; 455/456.6

(58) Field of Classification Search
USPC ......... 702/150, 79, 81, 84, 86, 89, 92, 94–95, 702/97, 127, 152–153, 158, 176, 187–189; 342/118, 125–126, 450–451, 458; 340/3.1–3.2, 3.21; 455/3.01, 403, 455/456.1, 456.3, 456.5–456.6, 500, 502; 701/465, 469, 478, 478.5, 484–485
See application file for complete search history.

(56) References Cited

U.S. PATENT DOCUMENTS

| | | | |
|---|---|---|---|
| 2002/0173322 A1 | 11/2002 | Turetzky et al. | 455/502 |
| 2005/0249178 A1 | 11/2005 | Bolgiano et al. | 370/342 |
| 2007/0252761 A1 | 11/2007 | Koorapaty et al. | 342/464 |
| 2012/0127977 A1 | 5/2012 | Copeland et al. | 370/338 |

OTHER PUBLICATIONS

Kabadayi et al., Software-Only TDOA/TRR Positioning for 3G WCDMA Wireless Network, Aug. 7, 2007, Wireless Communications and Mobile Computing, pp. 895-906.*
Yap et al., Dynamic Hystersis Value for Position Assisted Soft Handover, May 8-10, 2002, 3G Mobile Communication Technologies, Conference Publication No. 489 @ IEE 2002, pp. 500-504.*
International Search Report dated Oct. 2, 2012 issued in PCT counterpart application (No. PCT/US2012/047678).
Written Opinion dated Oct. 2, 2012 issued in PCT counterpart application (No. PCT/US2012/047678).

* cited by examiner

*Primary Examiner* — Toan Le
(74) *Attorney, Agent, or Firm* — Womble Carlyle

(57) ABSTRACT

Various methods, systems, and computer program products are disclosed for determining a location estimate of user equipment in a mobile network. For example, a method may include receiving measurement data that includes a time of arrival indication of data communicated between the user equipment and base stations of the mobile network. The method may further include processing only the received measurement data that is within a particular time window and excluding some of the received measurement data outside the particular time window. The method may further include determining a sync value based on the received measurement data within the time window. The sync value may synchronize timing between at least two base stations of the mobile network. The method may include determining a location of the user equipment based on the sync value and the measurement data. The method may include geometric or linear optimization of the determined location estimate.

38 Claims, 7 Drawing Sheets

SYSTEM AND METHOD FOR TUNING GEO-LOCATION IN WIDEBAND CODE DIVISION MULTIPLE ACCESS (WCDMA) NETWORKS

FIELD OF THE INVENTION

The disclosure relates to determining a location estimate for user equipment in a mobile network and in particular to tuning and optimizing location estimates based on measurement reports during soft handover and/or periodic reports sent by the mobile.

BACKGROUND OF THE INVENTION

Conventional mathematical techniques (e.g., triangulation, trilateration, multilateration) can be used for geo-location in WCDMA and other mobile networks. The accuracy of the geo-location may be affected by various factors. For example, the accuracy of the geo-location may be affected by the clock/time drift problem, where base stations may have internal clock times that differ from one another and from a user equipment in communication with the base stations. However, conventional techniques fail to adequately synchronize base stations to account for clock/time drift, which results in location estimates that rely on non-optimally or incorrectly synchronized measurement data. In other words, conventional techniques fail to adequately compensate for the time drift of sync estimates between pairs of base stations.

Conventional techniques also fail to adequately address the non-deterministic hyperbolas intersection solution when determining a location estimate. For example, when determining a location estimate, inaccuracies in the location measurement data can occur randomly or as a function of terrain or other problems. Such inaccuracies can result in skewed location estimates, making known hyperbola intersection solutions non-deterministic.

Conventional techniques also fail to adequately address the Geometric Dilution of Position ("GDP") problem, which occurs when base stations are unevenly spaced or when base stations overshoot, leading to skewed location estimates.

What is needed is optimized sync values that reduces the clock drift problem. What is further needed is to optimize the location estimate using geometric or linear optimizations in order to address the non-deterministic hyperbolas intersection solution. What is further needed is to use a reference location estimate in order to address the GDP problem. What is further needed is to be able to use measurement data already available to minimize the need to implement network changes in order to optimize location estimates. What is further needed is to use periodic measurement reports to enhance availability of measurement data in areas having less than ideal cell coverage. These and other problems exist.

SUMMARY OF THE INVENTION

Various methods, systems, and computer program products are disclosed for determining a location estimate of user equipment in a mobile network. In some implementations of the invention, measurement data already stored by network operators such as wireless carriers may be used to optimize location estimates. In these implementations, the location estimate may be optimized using data already available without network, hardware, or software modifications. Thus, network operators and others may use various implementations of the invention in order to optimize location estimates of user equipment operating on a mobile network. In some implementations of the invention, periodic measurements may be made in order to enhance the available data for location optimization. For example, areas having low density cell (base station) coverage may benefit from periodic measurement reports in order to increase the measurement data available for location optimization. In these implementations, periodic measurements may be beneficial for areas having low cell coverage.

In some implementations of the invention, a method for optimizing sync values may include receiving measurement data that includes a time of arrival indication of data communicated between the user equipment and base stations of the mobile network. In some implementations of the invention, the method may further include processing only the received measurement data that is within a particular time window and excluding some of the received measurement data outside the particular time window. In some implementations of the invention, the method may further include determining a sync value based on the received measurement data within the time window. The sync value may synchronize timing between at least two base stations of the mobile network. In some implementations of the invention, the method may include determining a location of the user equipment based on the sync value and the measurement data. In some implementations of the invention, the method may include geometric and/or linear optimization of the determined location estimate, thereby addressing the non-deterministic hyperbolas intersection problem.

In some implementations of the invention, a method for optimizing a location estimate of a user equipment in a mobile network may include receiving measurement data that includes a time of arrival indication of data communicated between the user equipment and at least two nodes of the mobile network. In some implementations of the invention, the method may include determining a location estimate based on the measurement data and a reference location estimate independent from the measurement data. In some implementations of the invention, the method may include determining an optimized location estimate based on the location estimate and the reference location estimate, thereby addressing the GDP problem.

In some implementations of the invention, the method may be used to localize where and when certain network events such as dropped calls, blocked calls, access failures, handover failures, and other network events occur. In this manner, using existing data or periodic measurement data, a network operator or others may determine improved location estimates in order to troubleshoot network problems or determine where good coverage exists.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

DETAILED DESCRIPTION OF THE INVENTION

Figure 1:
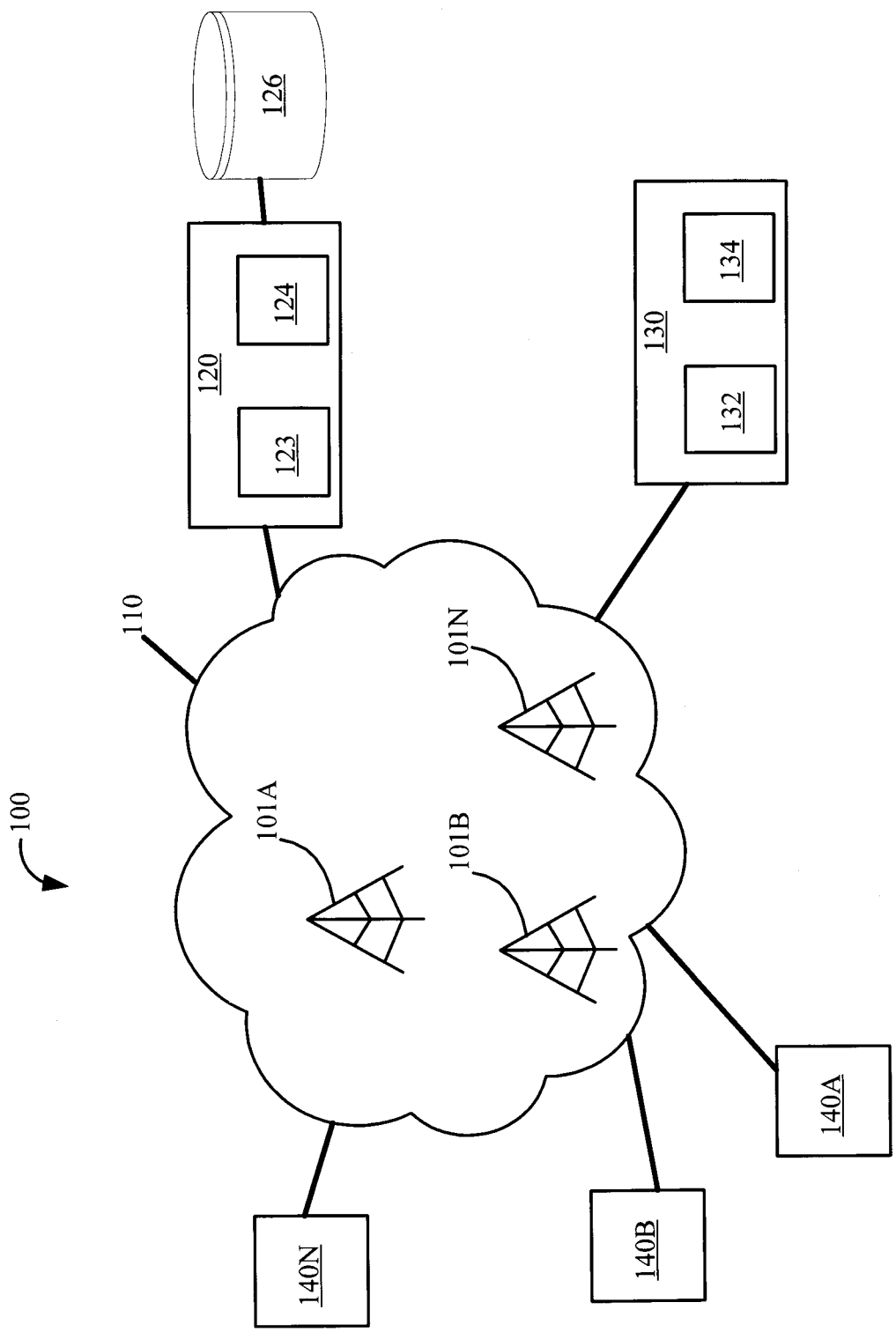
FIG. 1 is a block diagram illustrating a system of tuning a geo-location estimate of user equipment in a mobile network, according to various implementations of the invention.

FIG. 1 is a block diagram illustrating a system 100 for tuning a geo-location estimate of user equipment in a mobile network, according to various implementations of the invention. In some implementations of the invention, system 100 may be used to optimize (i.e., enhance accuracy or precision of) a location estimate of a user equipment 140 ("UE 140"). In some implementations of the invention, system 100 determines an optimal sync value that is used to improve timing between base stations 101 and UE 140, thereby addressing the clock drift problem. By optimizing the sync value in some implementations, location estimates based on the sync value may be improved.

In some implementations of the invention, system 100 may improve a location estimate by applying geometric optimization to the location estimate. In some implementations of the invention, system 100 may optimize the sync value and/or the location estimate based on real-time information already reported using conventional mobile networks. As such, in these implementations, system 100 may optimize geo-locations of mobile devices using information already available from various network operators. In some implementations of the invention, system 100 may use measurement data from periodic reports instead of or in addition to measurement data that is reported during Soft Handovers ("SOHOs") in order to enhance performance of the location estimate.

According to various implementations of the invention, system 100 may be used to localize where and when certain network events such as dropped calls, blocked calls, access failures, handover failures, and other network events occur.

According to various implementations of the invention, system 100 may include, but is not limited to, base stations 101 (illustrated in FIG. 1 as base station 101A, 101B, . . . , 101N), a provider server 120, a provider database 126, a computing device 130, and user equipment 140 (illustrated in FIG. 1 as UE 140A, 140B, . . . , 140N). In some implementations, base stations 101, provider server 120, computing device 130, and UE 140 may be communicably coupled to one another via a network 110. Network 110 may include a Local Area Network, a Wide Area Network, a cellular communications network, a Public Switched Telephone Network, and/or other network or combination of networks.

In some implementations of the invention, base stations 101 may provide wireless service for a mobile network such as a Wideband Code Division Multiple Access ("WCDMA") network, a Global System for Mobile Communications ("GSM") network, or other mobile network.

During operation of the mobile network, base stations 101 exchange data with UE 140. In some implementations of the invention, the exchanged data may include measurements by UE 140 or base stations 101 and/or event data. In particular, UE 140 may receive a signal from a base station 101. In some implementations, the signal from base station 101 may include a time indication, which may differ from a time indicated by an internal clock of UE 140. In some implementations, the difference may create a clock drift problem, which may cause inaccuracies when determining a geo-location estimate of UE 140 based on time difference of arrival ("TDOA") or other time-based location estimate.

In some implementations, UE 140 may include the time difference in a report such as a Radio Resource Control Measurement Report ("RRC_Measurement_Report"). In some implementations, the RRC_Measurement_Report is communicated only during soft handover ("SOHO") operations. In some implementations, the RRC_Measurement_Report may be communicated to provider server 120, which is typically but not always maintained by a mobile network operator such as a wireless carrier. In some implementations, provider server 120 may store a network events log, which may store, among other things, the RRC_Measurement_Report, General Performance Event Handling ("GPEH") data, and/or other network data.

In some implementation, provider server 120 may provide and/or store the RRC_Measurement_Report and network events log in a database such as provider database 126. As such, in some implementations, the RRC_Measurement_Report and network events log may be accessible in real-time or on-demand by system 100 in order to optimize geo-location estimates of UE 140. The RRC_Measurement_Report is a non-limiting example; other types of measurements and timing data may be used.

In some implementations of the invention, computing device 130 may synchronize timing of at least two base stations 101. In some implementations, computing device 130 synchronizes timing of at least two base stations 101 based on measurement data already available in event logs.

In some implementations of the invention, computing device 130 may receive measurement data. In some implementations, computing device 130 may receive the measurement data in the form of an RRC_Measurement_Report and/or network events log from provider server 120 and/or provider database 126 in order to synchronize timing.

In some implementations, the measurement data includes, without limitation, an identifier such as a scrambling code that identifies base station 101, a time stamp from base station 101 of the mobile network, a time difference (hereinafter, "Tm") between the time stamp and an internal clock of UE 140 in communication with base station 101, a location of base station 101, and a Carrier-to-noise Ratio ("Ec/No"). In some implementations, the Tm value may be reported in chips in the range [0 . . . 38399] representing the offset to the closest frame received from base station 101.

As would be appreciated, the measurement data may include the foregoing and other information for more than one base station 101. For example, in order to synchronize two base stations 101, the measurement data includes the foregoing and/or other information associated with the two base stations 101 in communication with UE 140. As would be further appreciated, the measurement data may include information for more than one UE 140. For example, the measurement data may include information for any UE 140 in communication with a base station 101.

In some implementations of the invention, computing device 130 may process only the received measurement data that is within a particular time window and exclude at least some of the received measurement data outside the particular time window. In other words, measurement data having time indications that fall outside the time window is not processed as discussed further below with respect to FIG. 2. In this manner, instead of averaging all data from the measurement data, only a subset of the measurement data that falls within the time window is processed at a given time, reducing clock drift. In other words, clock drift is reduced within certain time windows as opposed to averaging all Tm values. In some implementations, the time window includes the smallest fixed duration containing at least a certain sample count, which is a number of data points within the fixed duration. For example, the time window may include an approximately 5 minute time duration having at least 50 samples. In some implementations, the time window is variable, sliding and dynamic based on the sample count in order to ensure statistical significance and locality.

In some implementations of the invention, computing device 130 may determine a sync value based on the received measurement data within the time window. In some implementations, the sync value synchronizes timing between at least two base stations 101 of the mobile network. In some implementations, different pairs of base stations 101 may have different sync values. In other words, one pair of base stations 101 may have a sync value that is different from another pair of base stations 101. Thus, the determined sync value may be different for one pair of base stations 101 than another pair.

In some implementations of the invention, when determining a sync value for a particular pair of base stations 101, computing device 130 may iterate through measurement data associated with multiple different UE 140s that were in communication with the particular pair of base stations 101. Thus, in these implementations, computing device 130 may determine a sync value for the particular pair of base stations 101 based on measurement data associated with different UEs 140 communicating with or attempting to communicate with the particular pair of base stations 101. In some implementations, a more accurate sync value may be determined when more measurement data (whether from a single UE 140 or multiple UE 140s) is present such as when multiple SOHOs have occurred, more periodic data was recorded, or more call setup logs were recorded.

In some implementations of the invention, computing device 130 may eliminate one or more outliers from consideration when processing the measurement data. In other words, measurement data within the time window that are outliers may not be processed.

In some implementations of the invention, computing device 130 may determine a median value from among the measurement data. In some implementations, the median value is a peak value within the time window. In some implementations, the sync value may be determined based on the median value. In this manner, the sync value may be an optimum value according to the median value of measurement values falling within the time window.

In some implementations of the invention, computing device 130 may determine a location estimate of the user equipment based on the sync value and the measurement data. In some implementations of the invention, the location estimate may be expressed as, without limitation, latitude/longitude coordinates or Universal Transverse Mercator ("UTM") coordinates. In some implementations, the location estimate may be determined by multilateration, which may estimate the position of UE 140 by measuring the TDOA of a signal transmitted from synchronized base stations 101.

In some implementations, computing device 130 may use a time difference of System Frame Numbers ("SFNs") between two base stations 101 that is observed at UE 140 for multilateration (i.e., an "SFN-SFN observed time difference"), as given by the equation:

$$T_{CPICH}R \times A - T_{CPICH}R \times B \quad (1),$$

where $T_{CPICH}R \times A$ is the time when UE 140 receives one Primary CPICH slot from a base station 101A and $T_{CPICH}R \times B$ is the time when UE 140 receives the Primary CPICH slot from a base stations 101B, which is the base station 101 closest in time to $T_{CPICH}R \times A$. In some implementations, this is measured by UE 140 in both idle and active modes.

In some implementations of the invention, computing device 130 may use the time difference described by equation (1) above to determine a sync value (i.e., a timing offset) between pairs of base stations 101 in order to compensate for clock drift.

In some implementations of the invention, computing device 130 may determine an estimate of the position of UE 140 based on the sync value. For example, each OTDOA measurement for a pair of downlink transmissions (corresponding to a pair of base stations 101) describes a curve of constant difference along which UE 140 may be located. The timing of the downlink transmissions may be synchronized with one another based on the sync value in order to determine a location estimate of UE 140.

In some implementations of the invention, the geo-location of UE 140 is defined by points in space for which the distance to two base stations 101 is constant, which can be expressed by equation (2):

$$c(m/s)*TDOA(s)=c(m/s)*(t1(s)-t2(2))=R1(m)-R2(m) \quad (2),$$

where c is the speed of light, and R1 and R2 respectively represent the distance from UE 140 to two base stations 101. The curve of constant difference is represented in space by a hyperbola on which UE 140 may be located. The foci of the hyperbola are defined by the positions of the two base stations 101 for which the OTDOA is determined.

In some implementations of the invention, more than two base stations 101 may be used to determine a location estimate of UE 140. In these implementations, multiple hyperbolas are formed and computing device 130 may determine the estimated location of UE 140 based on the intersection of the multiple hyperbolas. For example, using a third base station 101, the location of UE 140 is given by the intersection of two hyperbolas as discussed in further detail below with respect to FIG. 2.

In some implementations of the invention, localization estimates may be formed by, without limitation, exact solutions of the hyperbolic TDOA equations, by Taylor-series expansions to linearize the equations, or by a least square minimization of the location error.

In some implementations of the invention, computing device 130 may receive or otherwise determine a location estimate and may optimize the location estimate. In some implementations, computing device 130 may optimize the location estimate in addition to optimizing the sync value as describe above. In some implementations, computing device 130 may perform geometric or linear optimization and/or optimize the location estimate based on a reference location estimate.

In some implementations of the invention, computing device 130 may perform geometric optimization on all location estimate solutions. In some implementations, computing device 130 may determine various permutations of a parameter used to determine the location estimate and may determine a corresponding location estimate for each permutation. For example, computing device 130 may alter the parameter according to an increment value that is added to or subtracted from the parameter value, where each of the altered parameter values is a permutation for which a location estimate is determined. In some implementations of the invention, computing device 130 selects the permutation that results in a location estimate closest to the geometric optimum. In some implementations, the parameter is the sync value. In other words, in these implementations, computing device 130 may test various permutations of the sync value that was used to determine the location estimate in order to optimize the location estimate.

In some implementations of the invention, computing device 130 may generate a hyperbola matrix that includes various combinations of the base stations 101 in communication with UE 140. For example, the measurement data may include information associated with five base stations 101 in communication with UE 140. In some implementations of the invention, computing device 130 may optimize the location estimate by processing each sync value associated with the five base stations 101. In some implementations, this may include processing information associated with each pair of base stations 101 in order to determine the optimum location estimate. For example, computing device 130 may determine a parameter value such as the sync value for each pair of base stations 101 until all combinations of pairs of base stations 101 are tested. In this manner, computing device 130 may leverage measurement data associated with multiple base stations 101 that may be in communication with UE 140. In some implementations, computing device 130 may optimize the parameter value using increment values for each combination of base stations 101. In some implementations, computing device 130 may include more than one UE 140 when optimizing the location estimate.

In some implementations of the invention, computing device 130 may optimize the location estimate based on a reference location estimate. The reference location estimate may reduce the impact of the GDP effect, which can be caused by inefficiently spaced base stations 101 and/or base stations 101 that overshoot. In some implementations, the reference location estimate includes a reference location based on a location of one or more best measured base stations 101 (i.e., base stations 101 for which locations are known and trusted).

According to various implementations of the invention, computing device 130 may include a processor 132, a memory 134, and/or other components that facilitate the functions of computing device 130 described herein. In some implementations of the invention, processor 132 includes one or more processors configured to perform various functions of computing device 130. In some implementations of the invention, memory 134 includes one or more tangible (i.e., non-transitory) computer readable media. Memory 134 may include one or more instructions that when executed by processor 132 configure processor 132 to perform the functions of computing device 130.

Figure 2:
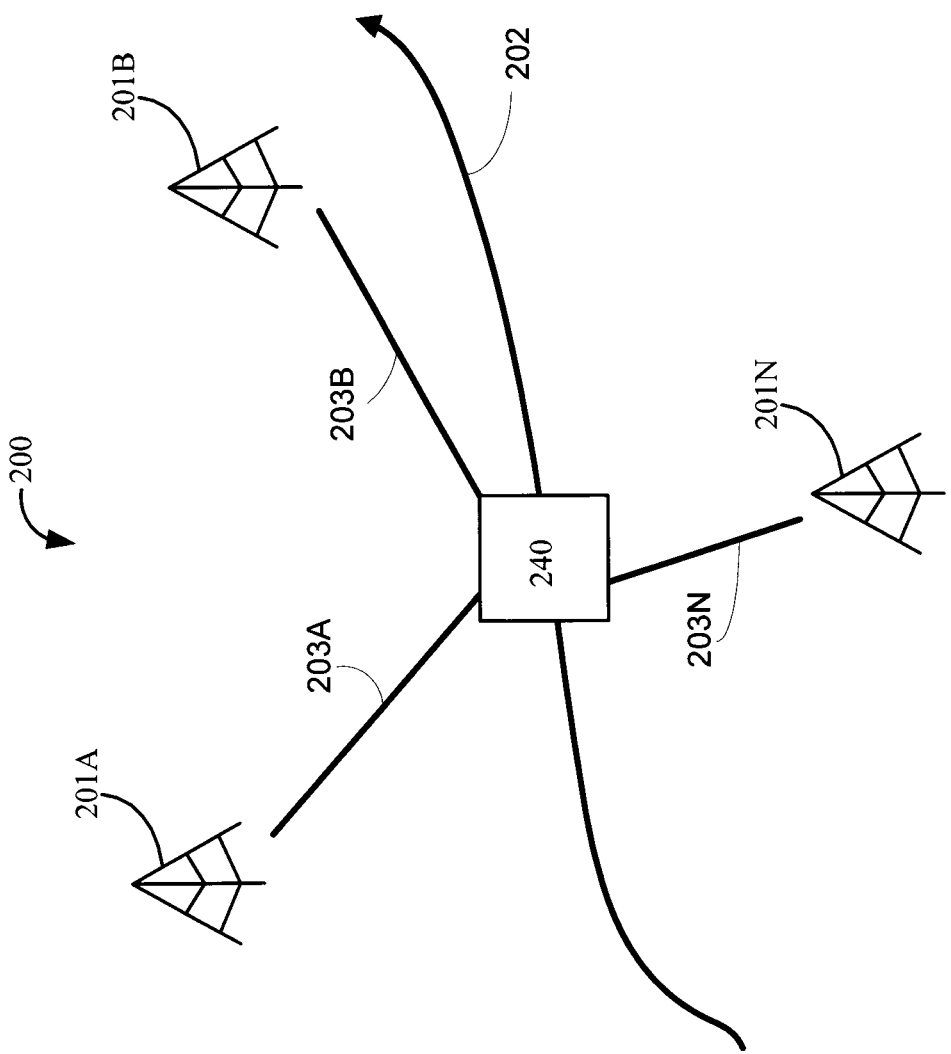
FIG. 2 is a block diagram illustrating base stations in communication with a user equipment, according to various implementations of the invention.

FIG. 2 is a block diagram illustrating base stations 201 in communication with a UE 240, according to various implementations of the invention. As illustrated, UE 240 is in communication with base stations 201 (illustrated in FIG. 2 as base stations 201A, 201B, ..., 201N) while travelling along a path 202. Although only three base stations 201 are illustrated, data from more base stations 201 may be used. In some implementations, measurement data may be accumulated as UE 240 travels along path 202. Thus, different measurement data may be available for UE 240 along path 202 over time. In some implementations, the time window discussed above with respect to FIG. 1 may include a subset of these measurements. Also as illustrated, each base station 201A, 201B, ..., 201N is a distance R (illustrated in FIG. 2 as respective distances R1, R2, ..., R3) away from UE 140. Each base station 201 has a known location, which for illustrative purposes is given by Cartesian coordinates $(x_i, y_i)$.

In some implementations, each distance 203 may be determined according to the equation:

$$c*T_i = R_i = \sqrt{(xi-x)^2+(yi-y)^2} \qquad (3),$$

where xi=identifies an x coordinate of one of base stations 201, yi indicates a y coordinate of one of base stations 201, c is the speed of light, Ri indicates one of distances 203 to a corresponding base station 201, and Ti is a timestamp from a corresponding base station 201.

In some implementations of the invention, the OTDOA of signals from two base stations 201 may be determined based on the equation:

$$c*(T1-T2) = c*OTDOA = R1 - R2 = R1, \qquad (4)$$
$$2 = \sqrt{(x1-x)^2+(y1-y)^2} - \sqrt{(x2-x)^2+(y2-y)^2},$$

where (x1, y1) and (x2, y2) represent the location of base stations 201A, 201B. Equation (4) represents a hyperbola having foci represented by the location of base stations 201A and 201B.

In some implementations of the invention, a third base station 201N may be accounted for according to the equation:

$$c*(T1-T3) = c*OTDOA = R1 - R3 = R1, \qquad (5)$$
$$3 = \sqrt{(x1-x)^2+(y1-y)^2} - \sqrt{(x3-x)^2+(y3-y)^2}.$$

Equation (5) represents a hyperbola having foci represented by the location of base stations 201A and 201N.

In some implementations, equations (4) and (5) may represent two hyperbolas, the intersection of which may be used to determine the location estimate (x, y) of UE 240.

Figure 3:
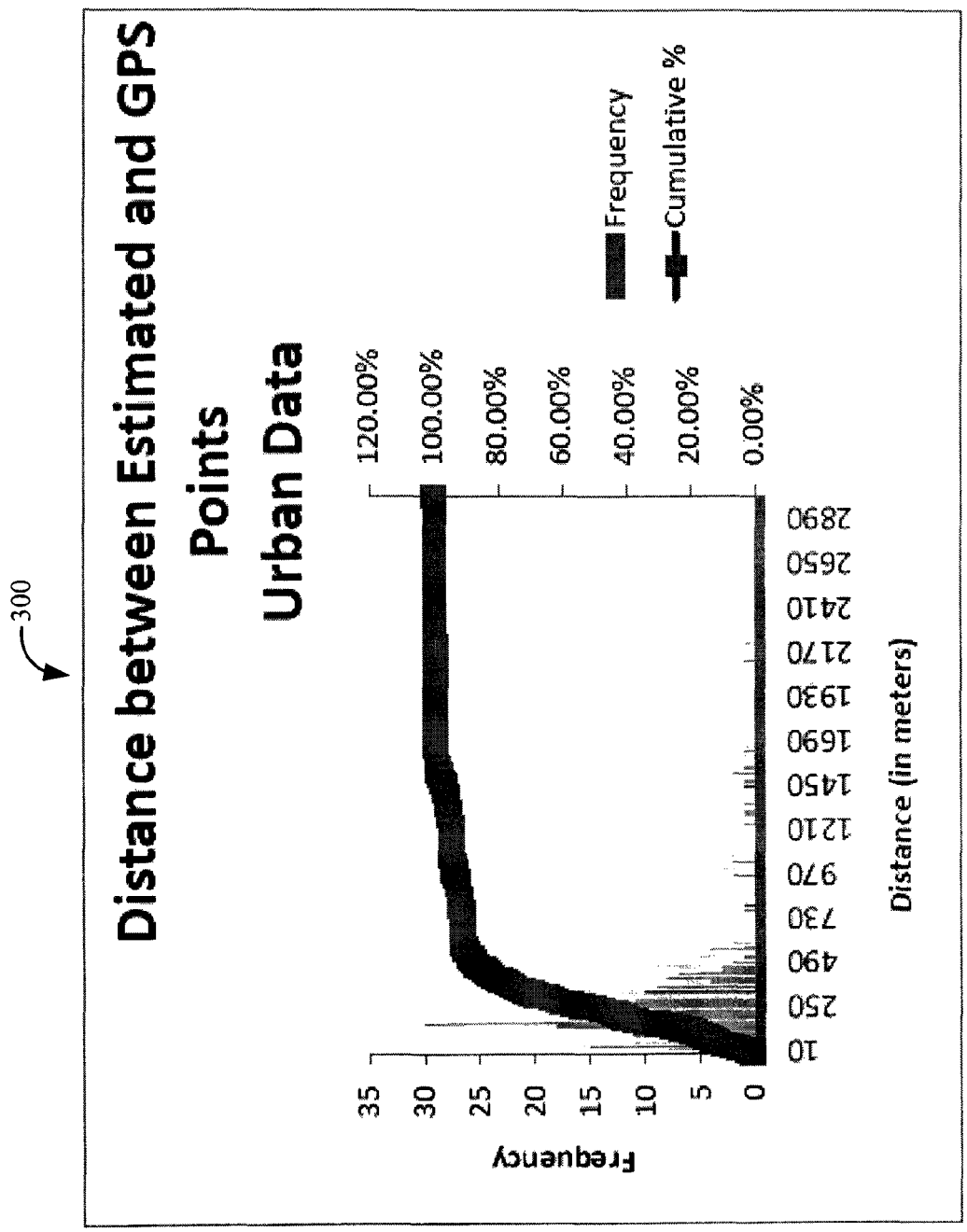
FIG. 3 is a graph that illustrates experimental results of error distribution of the location estimate described herein using data from urban locations, according to various implementations of the invention.
Figure 4:
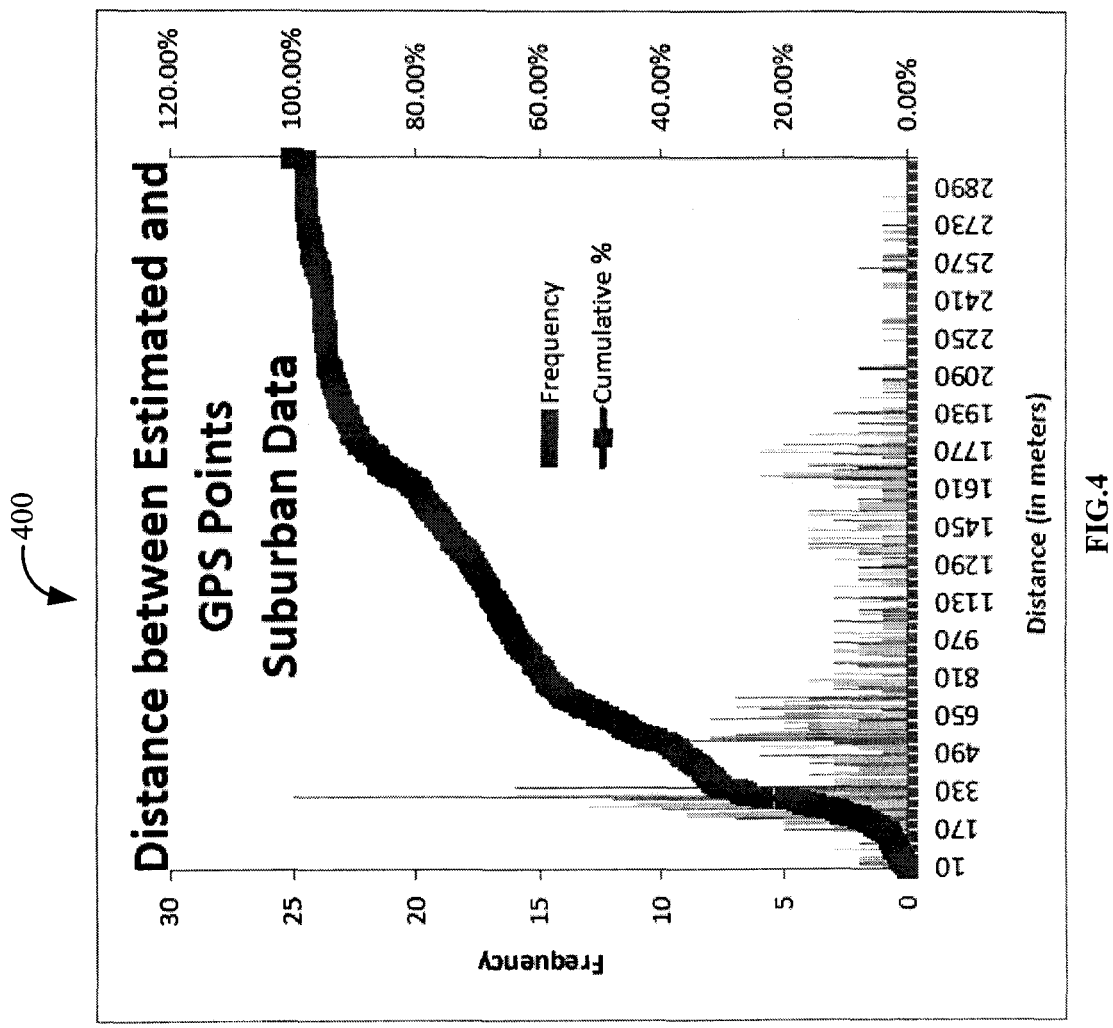
FIG. 4 is a graph that illustrates experimental results of error distribution of the location estimate described herein using data from suburban locations, according to various implementations of the invention.

FIG. 3 is a graph 300 that illustrates experimental results of error distribution of the location estimate described herein using data from urban locations, according to various implementations of the invention. Urban areas are typically characterized by denser cell sites and accordingly more SOHOs. Thus, more measurement data is available for the determining the location estimate, resulting in smaller confidence intervals (less than 15 m) than in an area having less coverage (such as suburban areas, results of which are illustrated in FIG. 4). The error's distribution has fairly short tails with a hard cut-off around 480 m at 87.21% percentile. In addition, bins containing more than 2% of the samples' population are concentrated within the range 30 m to 350 m. Graph 300 also shows that the median geo-location estimate's error is of 247.91 m with 95% confidence intervals less than 15 m.

FIG. 4 is a graph 400 that illustrates experimental results of error distribution of the location estimate described herein using data from suburban locations, according to various implementations of the invention. Suburban areas are typically characterized by larger cell sites and less SOHO events. This behavior is reflected on the estimate's error as illustrated in Table 3 below. The 67% percentile goes up to about 920.38 mm and its 95% confidence interval is about 100 m. In addition, the distribution's tails are long and a cut-off is harder to determine. However, the bins containing more than 2% of the samples' population are concentrated in the 230 m to 350 m range. However, the results show a median error of 611.32 m with a 95% confidence interval of less than 60 m. The main reason of this higher median error value in comparison to the most populated error's bins concentration is due to the long distribution's tails generated by the suburban environment itself.

Therefore, periodic reports for measurements in suburban areas (as opposed to measurement data that is passively obtained from network operators) may improve performance of the geo-location estimate. Periodic reports may generate more measurements and possibly compensate for the large spread of the cell sites within suburban areas.

Table 3 summarizes the results of location estimates on a large number of datasets collected in different types of geography, demography and topology. In addition, the datasets have been collected in different markets and for different operators. All the results are based on measurement reports with at least three base stations. The average site to site distance is also provided as reference for the geo-location estimate accuracy.

TABLE 3

Accuracy results

| Area | Median error (m) | 95% Confidence Interval (m) | 67% percentile error (m) | 95% Confidence Interval (m) | Total number of samples | Average site to site distance (m) |
|---|---|---|---|---|---|---|
| Urban | 247.91 | (240.93, 253.95) | 317.0 | (310.05, 321.62) | 657 | 544.56 |
| Suburban | 611.32 | (588.22, 638.33) | 920.38 | (868.43, 974.1),) | 587 | 2099.1 |

Figure 5:
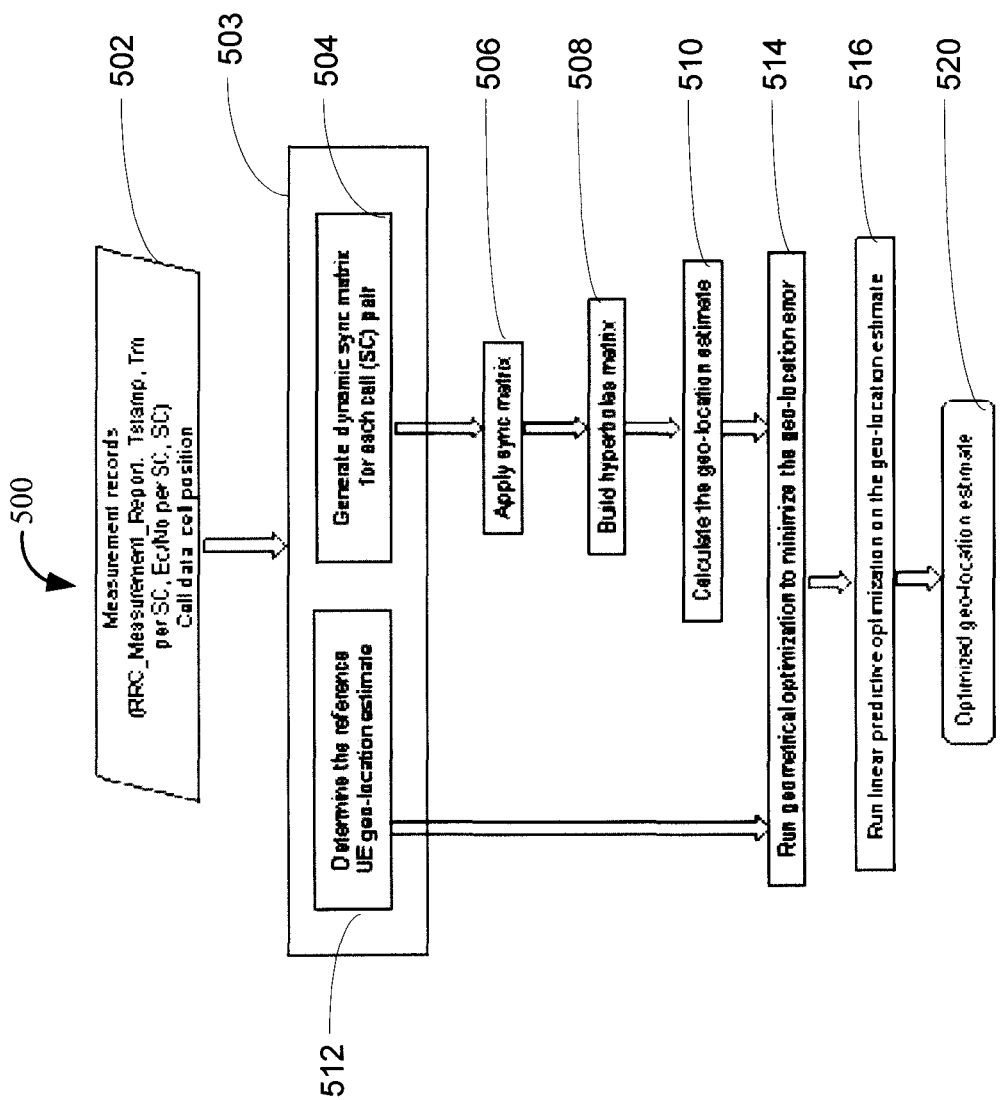
FIG. 5 is a flow diagram illustrating an example of a process for optimizing a geo-location estimate of user equipment, according to various implementations of the invention.

FIG. 5 is a flow diagram illustrating an example of a process 500 of optimizing a geo-location estimate of user equipment, according to various implementations of the invention. The various processing operations and/or data flows depicted in FIG. 5 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, in an operation 502, process 500 may include receiving measurement data such as an RRC_Measurement_Report. In some implementations, the measurement data may include, without limitation, a time stamp from a base station, a Tm value per base station, an Ec/No per base station, a scrambling code or other identifier that identifies the base station, and a location (e.g., coordinates) of the base station. In some implementations, the measurement data includes the foregoing information for multiple base stations and multiple user equipment such that measurement data for network traffic of various user equipment communicating with various base stations may be obtained.

Based on the measurement data, process 500 may determine and/or optimize a location estimate for a user equipment, such as user equipment 140 and 240 illustrated in FIGS. 1 and 2.

In some implementations of the invention, in an operation 503, process 500 may include sub-operations 505 and 507. In some implementations, sub-operation 505 and corresponding operations 506-510 discussed below may optimize a sync value and determine a location estimate based on the optimized sync value. In some implementations, sub-operation 507 may determine a reference location estimate in order to optimize a location estimate. In some implementations, using the reference location of sub-operation 507, process 500 may optimize the location estimate determined using operations 505-510. In other implementations, using the reference location of sub-operation 507, process 500 may optimize a location estimate determined by a network operator (e.g., a wireless carrier) and/or by the user equipment.

In some implementations of the invention, returning to discussion of operation 505, process 500 may include generating a dynamic sync matrix for each pair of base stations in communication with a particular user equipment. The dynamic sync matrix may include multiple pairs of base stations communicating with different user equipment, so long as the matrix includes pair-wise comparisons of two base stations communicating with a user equipment. In some implementations, more data points (i.e., more measurement data) for the dynamic sync matrix may improve performance of the location estimate.

In some implementations of the invention, in an operation 506, process 500 may include applying the dynamic sync matrix in order to derive a set of geo location estimates. In some implementations of the invention, in an operation 508, process 500 may include building a hyperbola matrix, where each hyperbola includes foci that represent a pair of base stations in communication with a user equipment.

In some implementations of the invention, in an operation 510, process 500 may include determining a location estimate for a user equipment based on the hyperbola matrix, where an intersection of hyperbola is used to determine the location estimate.

In some implementations of the invention, in an operation 514, process 500 may include running a geometric optimization of the location estimate in order to reduce geo-location error. In some implementations, the dynamic sync matrix is iteratively adjusted in order to derive the estimates which are closest to a geometric reference. In some implementations, the adjustment may include iteratively adjusting a sync value associated with a base station that is included in the dynamic sync matrix and determining a sync value that results in a location estimate that is closest to the geometric reference. In some implementations, the geometric reference includes the geometrical centroid of one or more best measured base stations. In some implementations of the invention, in an operation 516, process 500 may include running a linear predictive optimization on the location estimate. In some implementations, the density distribution of the geo location estimates is determined. In some implementations, the average value of the most populated bin of the density distribution is used as the geo location estimate. In some implementations of the invention, in an operation 518, process 500 may include determine the optimized location estimate based on the dynamic sync matrix, the reference location estimate, the geometrical optimization, and/or the linear predictive optimization.

Figure 6:
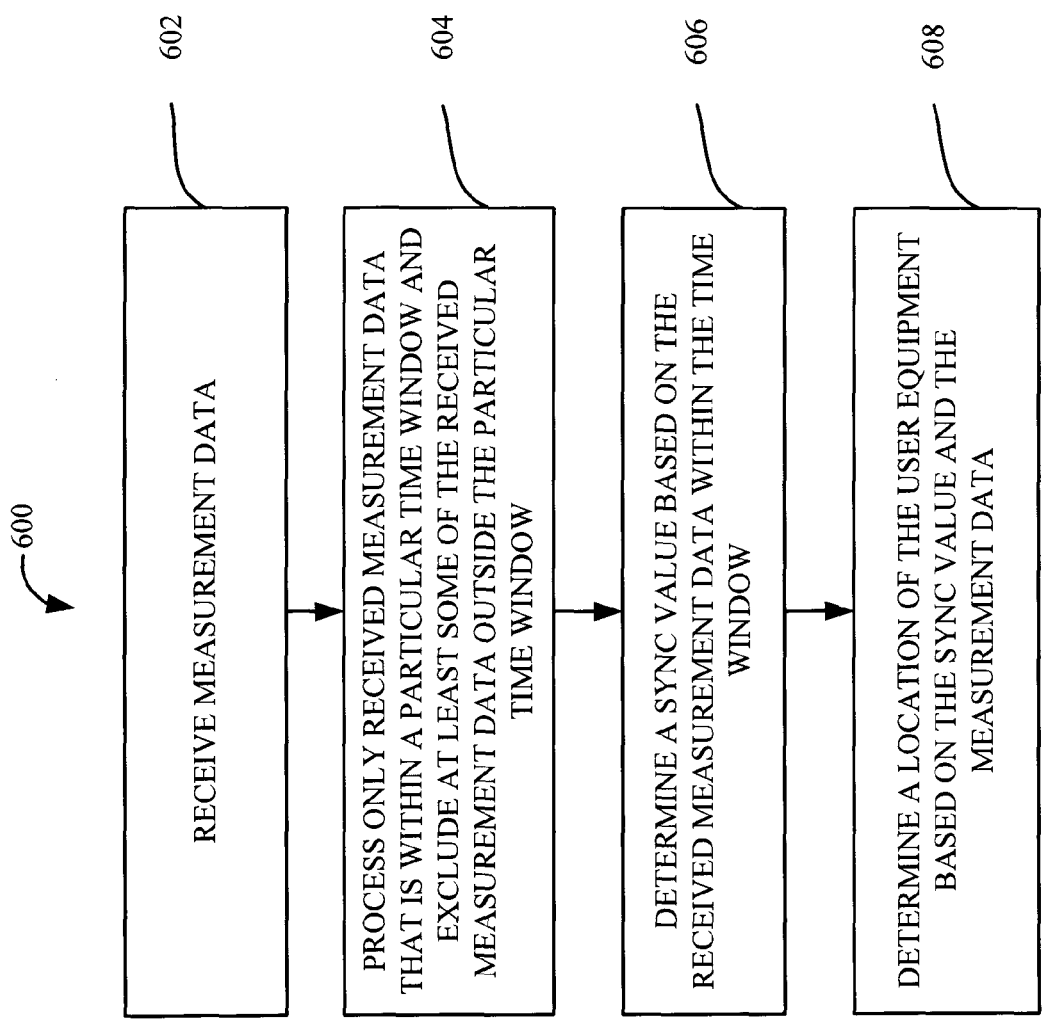
FIG. 6 is a flow diagram illustrating an example of a process for optimizing a sync value used to synchronize base stations, according to various implementations of the invention.

FIG. 6 is a flow diagram illustrating an example of a process 600 of optimizing a sync value for synchronizing base stations, according to various implementations of the invention.

In some implementations of the invention, in an operation 602, process 600 may include receiving measurement data, wherein the measurement data comprises a time of arrival indication of data communicated between a user equipment and at least two nodes of the mobile network.

In some implementations of the invention, in an operation 604, process 600 may include processing only the received measurement data that is within a particular time window and excluding at least some of the received measurement data outside the particular time window.

In some implementations of the invention, in an operation 606, process 600 may include determining a sync value based on the received measurement data within the time window, wherein the sync value synchronizes timing between at least two nodes of the mobile network.

In some implementations of the invention, in an operation 608, process 600 may include determining a location of the user equipment based on the sync value and the measurement data.

Figure 7:
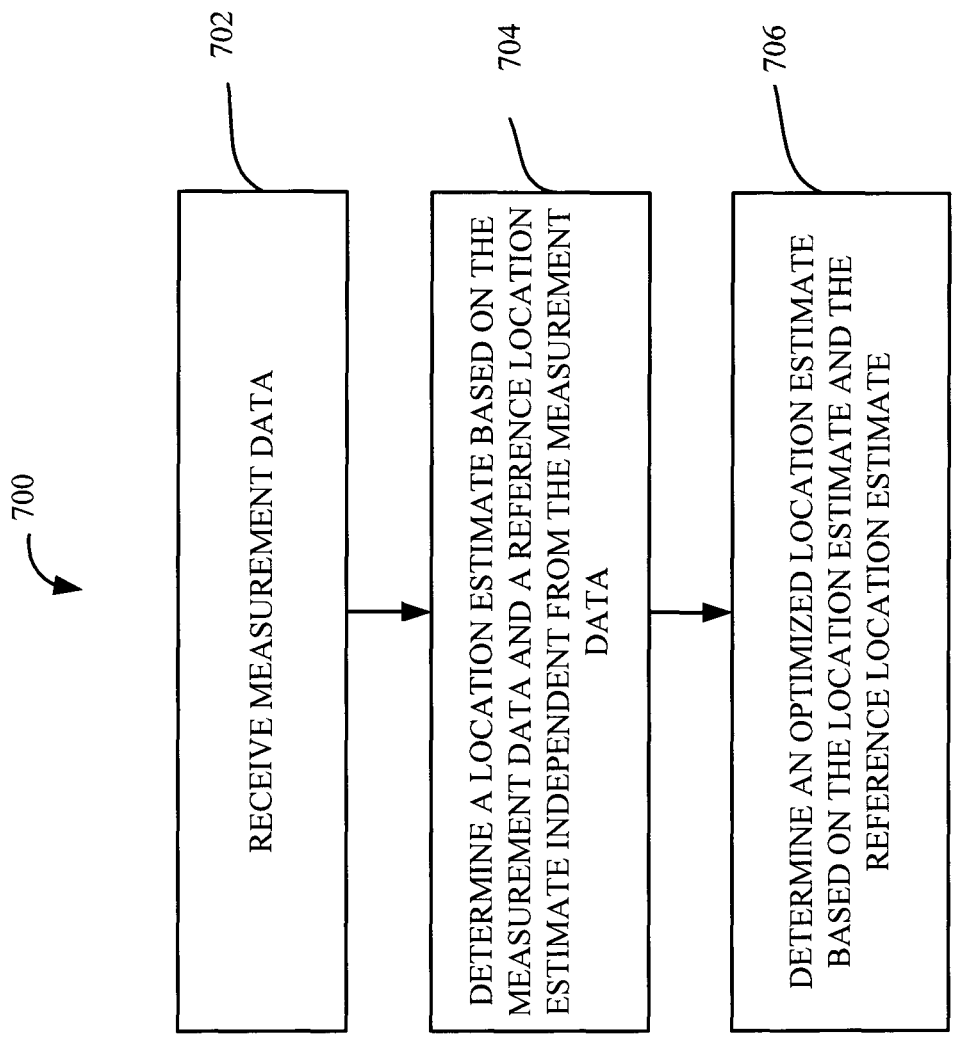
FIG. 7 is a flow diagram illustrating an example of a process for optimizing a predetermined location of user equipment, according to various implementations of the invention.

FIG. 7 is a flow diagram illustrating an example of a process 700 of optimizing a predetermined location of user equipment, according to various implementations of the invention.

In some implementations of the invention, in an operation 702, process 700 may include receiving measurement data, wherein the measurement data comprises a time of arrival indication of data communicated between the user equipment and at least two nodes of the mobile network;

In some implementations of the invention, in an operation 704, process 700 may include determining a location estimate based on the measurement data and a reference location estimate independent from the measurement data; and In some implementations of the invention, in an operation 706, process 700 may include determining an optimized location estimate based on the location estimate and the reference location estimate.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method for synchronizing timing of at least two nodes of a mobile network, comprising:
receiving, by a computing device, measurement data from a provider server and/or provider database, wherein the measurement data comprises a time of arrival indication of data communicated between each of a plurality of user equipment and at least two nodes of the mobile network;
processing, by the computing device, only the received measurement data that is within a particular time window and excluding at least some of the received measurement data outside the particular time window;
determining, by the computing device, a sync value based on the received measurement data from each of said plurality of user equipment within the time window, wherein the sync value synchronizes timing between at least two nodes of the mobile network; and
determining, by the computing device, a location of a selected one of said plurality of user equipment based on the sync value and the measurement data, wherein:
the computing device is distinct from both the selected one of said plurality of user equipment and the at least two nodes of the mobile network.

2. The computer-implemented method of claim 1, wherein the time window comprises a smallest fixed duration that includes a minimum sample count.

3. The computer-implemented method of claim 2, wherein the time window is variable, sliding, and dynamic based on the sample count.

4. The computer-implemented method of claim 1, wherein determining a location comprises determining a location by multilateration, triangulation, or trilateration.

5. The computer-implemented method of claim 1, wherein determining a location comprises generating a hyperbola matrix of at least three base stations communicating with the selected one of said plurality of user equipment, and wherein the location is determined based on an intersection of hyperbola within the hyperbola matrix.

6. The computer-implemented method of claim 1, further comprising optimizing the determined location.

7. The computer-implemented method of claim 6, wherein optimizing the determined location comprises a geometric optimization.

8. The computer-implemented method of claim 7, wherein the geometric optimization comprises:
generating a dynamic sync matrix comprising at least three base stations communicably coupled to the selected one of said plurality of user equipment;
iteratively adjusting a parameter associated with the at least three base stations;
determining a plurality of location estimates based on the iteratively adjusted parameter; and deriving the location estimate based on a particular one of the plurality of location estimates that is closest to a geometric reference.

9. The computer-implemented method of claim 8, wherein iteratively adjusting a parameter comprises iteratively adjusting a sync value that synchronizes a timing between at least two nodes of the mobile network.

10. The computer-implemented method of claim 8, wherein the geometric reference comprises one or more best measured base stations.

11. The computer-implemented method of claim 6, wherein optimizing the determined location comprises a linear optimization.

12. The computer-implemented method of claim 11, wherein the linear optimization comprises:
   determining a density of location estimates based on the measurement data;
   determining a plurality of bins based on the density of location estimates;
   averaging a most populated one of the plurality of bins; and
   determining location estimate based on the averaging.

13. The computer-implemented method of claim 1, wherein the measurement data comprises time delay of arrival information in a report communicated only during soft handover operations.

14. A computer-implemented method of optimizing a location estimate of a selected one of a plurality of user equipment in a mobile network, comprising:
   receiving, by a computing device, measurement data from a provider server and/or provider database, wherein the measurement data comprises a time of arrival indication of data communicated between each of said plurality of user equipment and at least two nodes of the mobile network;
   determining, by the computing device, a location estimate for the selected one of said plurality of user equipment based on the measurement data and a reference location; and
   determining an optimized location estimate for the selected one of said plurality of user equipment based on the location estimate and the reference location; wherein:
      determining the location estimate for the selected one of said plurality of user equipment is based on measurement data from each of said plurality of user equipment; and
      the computing device is distinct from both the selected one of said plurality of user equipment and the at least two nodes of the mobile network.

15. The computer-implemented method of claim 14, wherein determining an optimized location estimate comprises:
   generating a dynamic sync matrix comprising at least three base stations communicably coupled to the selected one of said plurality of user equipment;
   iteratively adjusting a parameter associated with the at least three base stations;
   determining a plurality of location estimates based on the iteratively adjusted parameter; and
   deriving the optimized location estimate based on a particular one of the plurality of location estimates that is closest to the reference location.

16. The computer-implemented method of claim 15, wherein iteratively adjusting a parameter comprises iteratively adjusting a sync value that synchronizes a timing between at least two base stations of the mobile network, wherein the sync value is based on the measurement data from each of said plurality of user equipment.

17. The computer-implemented method of claim 15, wherein the reference location comprises a geometrical centroid of a best measured base station.

18. The computer-implemented method of claim 15, wherein iteratively adjusting a parameter value further comprises:
   determining, by the computing device, a range of parameter values around the parameter value;
   determining, by the computing device, a corresponding range of location estimates based on the range of parameter values; and
   determining, by the computing device, the optimized location based on a particular one of the corresponding range of location estimates that is closest to the reference location.

19. The computer-implemented method of claim 14, wherein the measurement data comprises time delay of arrival information in a report communicated only during soft handover operations.

20. A system for synchronizing timing of at least two nodes of a mobile network, comprising:
   a computing device comprising a processor configured to:
      receive measurement data from a provider server and/or provider database, wherein the measurement data comprises a time of arrival indication of data communicated between each of a plurality of user equipment and at least two nodes of the mobile network;
      process only the received measurement data that is within a particular time window and excluding at least some of the received measurement data outside the particular time window;
      determine a sync value based on the received measurement data within the time window from each of said plurality of user equipment, wherein the sync value synchronizes timing between at least two nodes of the mobile network; and
      determine a location of a selected one of said plurality of user equipment based on the sync value and the measurement data; wherein:
      the computing device is distinct from both the selected one of said plurality user equipment and the at least two nodes of the mobile network.

21. The system of claim 20, wherein the time window comprises a smallest fixed duration that includes a minimum sample count.

22. The system of claim 21, wherein the time window is variable, sliding, and dynamic based on the sample count.

23. The system of claim 20, the computing device further configured to determine a location by multilateration, triangulation, or trilateration.

24. The system of claim 20, the computing device further configured to generate a hyperbola matrix of at least three base stations communicably coupled with the selected one of said plurality user equipment, wherein the location is determined based on an intersection of hyperbola within the hyperbola matrix.

25. The system of claim 20, the computing device further configured to optimize the determined location.

26. The system of claim 25, the computing device further configured to optimize the determined location based on a geometric optimization.

27. The system of claim 26, the computing device further configured to:
   generate a dynamic sync matrix comprising at least three base stations communicably coupled to the selected one of the plurality of user equipment;

iteratively adjust a parameter associated with the at least three base stations;
determine a plurality of location estimates based on the iteratively adjusted parameter; and
derive the location estimate based on a particular one of the plurality of location estimates that is closest to a geometric reference.

28. The system of claim 27, the computing device further configured to iteratively adjust a sync value that synchronizes a timing between at least two nodes of the mobile network.

29. The system of claim 27, wherein the geometric reference comprises one or more best measured base stations.

30. The system of claim 25, the computing device further configured to optimize the determined location based on a linear optimization.

31. The system of claim 30, the computing device further configured to:
determine a density of location estimates based on the measurement data;
determine a plurality of bins based on the density of location estimates;
average a most populated one of the plurality of bins; and
determine location estimate based on the averaging.

32. The system of claim 20, wherein the measurement data comprises time delay of arrival information in a report communicated only during soft handover operations.

33. A system of optimizing a location estimate of a selected one of a plurality of user equipment in a mobile network, comprising:
a computing device comprising a processor configured to:
receive measurement data from a provider server and/or provider database, wherein the measurement data comprises a time of arrival indication of data communicated between each of said plurality of user equipment and at least two nodes of the mobile network;
determine a location estimate for the selected one of a plurality of user equipment based on the measurement data and a reference location; and
determine an optimized location estimate for the selected one of a plurality of user equipment based on the location estimate and the reference location;
wherein:
determining the location estimate for the selected one of said plurality of user equipment is based on measurement data from each of said plurality of user equipment; and
the computing device is distinct from both the selected one of said plurality of user equipment and the at least two nodes of the mobile network.

34. The system of claim 33, the computing device further configured to:
generate a dynamic sync matrix comprising at least three base stations communicably coupled to the selected one of said plurality of user equipment;
iteratively adjust a parameter associated with the at least three base stations;
determine a plurality of location estimates based on the iteratively adjusted parameter; and
derive the optimized location estimate based on a particular one of the plurality of location estimates that is closest to the reference location.

35. The system of claim 34, the computing device further configured to iteratively adjust a sync value that synchronizes a timing between at least two base stations of the mobile network, wherein the sync value is based on the measurement data from each of said plurality of user equipment.

36. The system of claim 34, wherein the reference location comprises a geometrical centroid of a best measured base station.

37. The system of claim 34, the computing device further configured to:
determine a range of parameter values around the parameter value;
determine a corresponding range of location estimates based on the range of parameter values; and
determine the optimized location based on a particular one of the corresponding range of location estimates that is closest to the reference location.

38. The system of claim 33, wherein the measurement data comprises time delay of arrival information in a report communicated only during soft handover operations.

* * * * *